(12) United States Patent
Nakada

(10) Patent No.: US 7,180,267 B2
(45) Date of Patent: *Feb. 20, 2007

(54) CAPACITY ADJUSTMENT APPARATUS FOR BATTERY PACK AND CAPACITY ADJUSTMENT METHOD FOR BATTERY PACK

(75) Inventor: Yuji Nakada, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,843

(22) Filed: Mar. 16, 2005

(65) Prior Publication Data

US 2005/0212481 A1    Sep. 29, 2005

(30) Foreign Application Priority Data

Mar. 23, 2004    (JP) ............................. 2004-084587

(51) Int. Cl.
*H02J 7/00*    (2006.01)

(52) U.S. Cl. .................................................... 320/132

(58) Field of Classification Search ................ 320/132, 320/136, 120, 104; 180/65.2; 318/140
See application file for complete search history.

(56) References Cited

U.S. PATENT DOCUMENTS

| 5,998,969 A | * | 12/1999 | Tsuji et al. .................. 320/132 |
| 6,160,380 A | * | 12/2000 | Tsuji et al. .................. 320/132 |
| 6,417,648 B2 | * | 7/2002 | Suzuki et al. ................ 320/136 |
| 6,932,174 B2 | * | 8/2005 | Hirata et al. ................ 180/65.2 |
| 7,019,489 B2 | * | 3/2006 | Nakada ....................... 320/104 |
| 2004/0018419 A1 | * | 1/2004 | Sugimoto et al. ............. 429/61 |
| 2005/0212482 A1 | * | 9/2005 | Nakada ....................... 320/120 |
| 2005/0212487 A1 | * | 9/2005 | Sodeno ....................... 320/132 |

FOREIGN PATENT DOCUMENTS

| EP | 1289096 | * | 6/2003 |
| JP | 09084205 | * | 3/1997 |
| JP | 10-322925 A | | 12/1998 |
| JP | 11150873 | * | 6/1999 |

* cited by examiner

*Primary Examiner*—Pia Tibbits
(74) *Attorney, Agent, or Firm*—Foley & Lardner LLP

(57) ABSTRACT

If the voltage at any cell has become equal to or lower than a low-voltage decision-making voltage Vc1 and the average voltage among cells calculated based upon the total voltage at a battery cell is higher than a predetermined voltage level, it is determined that a voltage variance among the individual cells has occurred and that a capacity adjustment is necessary.

11 Claims, 7 Drawing Sheets

CAPACITY ADJUSTMENT APPARATUS FOR BATTERY PACK AND CAPACITY ADJUSTMENT METHOD FOR BATTERY PACK

BACKGROUND OF THE INVENTION

1. Field of the Invention

The present invention relates to a capacity adjustment apparatus and a capacity adjustment method to be adopted in conjunction with a battery pack constituted with a plurality of cells.

2. Description of Related Art

There is an apparatus known in the related art that executes a capacity adjustment for a plurality of cells constituting a battery pack by detecting the open circuit voltages at the individual cells and individually discharging the cells based upon the voltage distribution of the detected open circuit voltages (see Japanese Laid Open Patent Publication No. H10-322925).

SUMMARY OF THE INVENTION

However, the capacity adjustment apparatus in the related art has a problem in that the cost of the capacity adjustment apparatus, which needs a microcomputer to determine through an arithmetic operation the voltage distribution of the voltages at the individual cells, is bound to be significant.

A battery pack capacity adjustment apparatus for a battery pack constituted by connecting in series a plurality of cells includes a cell voltage detection device that detects cell voltages at the plurality of cells, a first voltage decision-making device that makes a decision as to whether or not there is any cell with a voltage lower than a predetermined low-voltage decision-making voltage among the cell voltages detected by the cell voltage detection device, a second voltage decision-making device that makes a decision as to whether or not a voltage value determined based upon the voltages at the individual cells is higher than a predetermined threshold value, and a capacity adjustment decision-making device that determines that a capacity adjustment for the plurality of cells is necessary if the first voltage decision-making device decides that there is a cell with a voltage lower than the predetermined low-voltage decision-making voltage and the second voltage decision-making device decides that the voltage value determined based upon the voltages at the individual cells is higher than the predetermined threshold value.

A battery pack capacity adjustment method for a battery pack constituted by connecting in series a plurality of cells, includes steps for detecting cell voltages at the plurality of cells, making a decision as to whether or not there is any cell with a voltage lower than a predetermined low-voltage decision-making voltage among the cell voltages having been detected, making a decision as to whether or not a voltage value determined based upon the voltages at the individual cells is higher than a predetermined threshold value, and determining that a capacity adjustment for the plurality of cells is necessary if a cell with a voltage lower than the predetermined low-voltage decision-making voltage is judged to be present and the voltage value determined based upon the voltages at the individual cells is judged to be higher than the predetermined threshold value.

DETAILED DESCRIPTION OF THE PREFERRED EMBODIMENT

Figure 1:
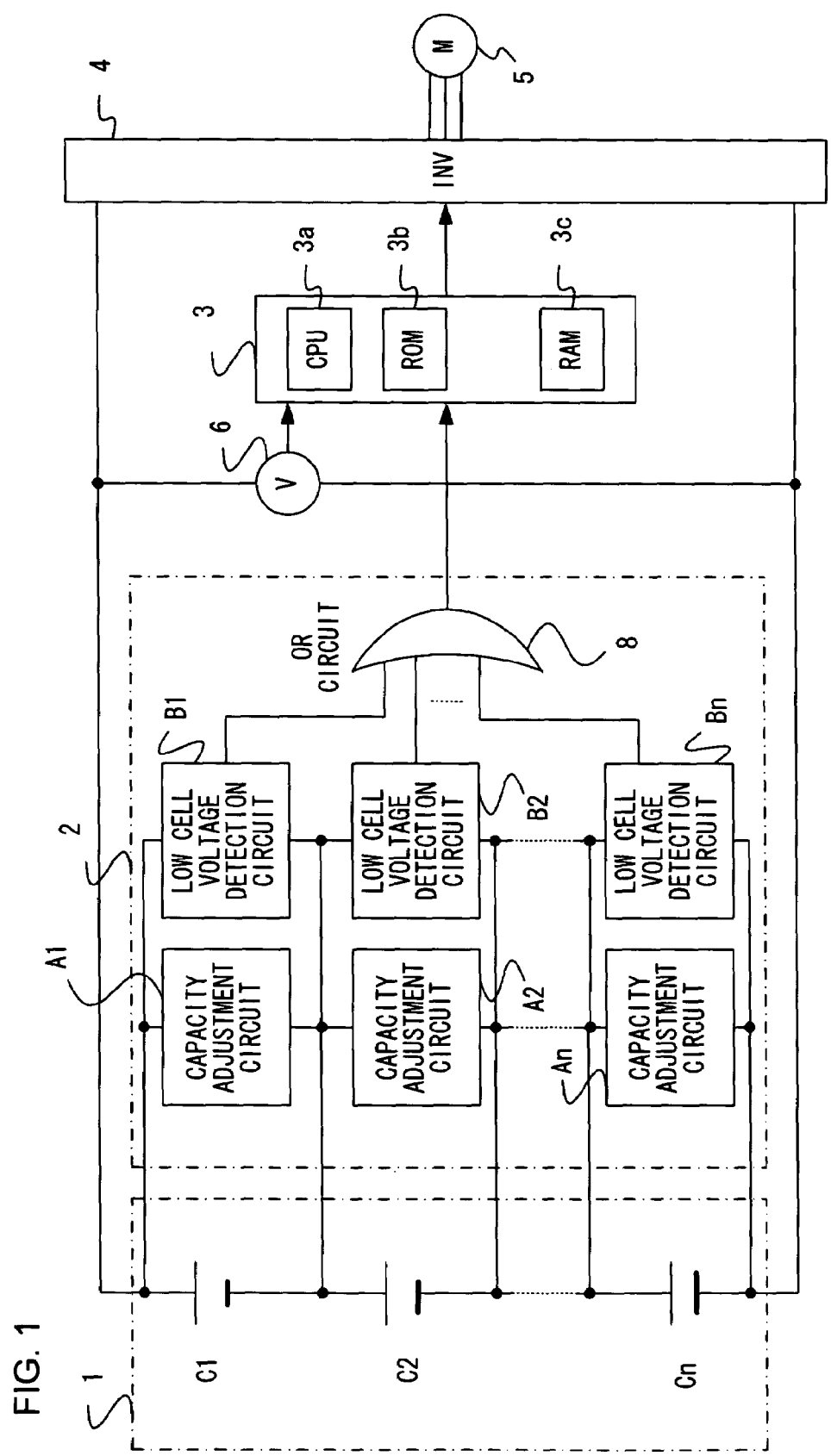
FIG. 1 shows the system configuration of an embodiment in which the battery pack capacity adjustment apparatus according to the present invention is adopted in a hybrid car.

FIG. 1 shows the system configuration of an embodiment in which the battery pack capacity adjustment apparatus according to the present invention is adopted in a hybrid car. A battery pack 1 is constituted by connecting in series n (n: positive integer) cells C1 to Cn. An AC voltage obtained by converting at an inverter 4 a DC voltage of the battery pack 1 is applied to a three-phase AC motor 5 which is a traveling drive source of the vehicle. A control unit 3, which includes a CPU 3a, a ROM 3b and a RAM3c, charges and discharges the battery pack 1 by controlling the inverter 4. A voltage sensor 6 detects the total voltage $V_{bat}$ at the battery pack 1 and outputs the detected total voltage to the control unit 3.

Capacity adjustment circuits A1 to An respectively provided in correspondence to the cells C1 to Cn each discharge the corresponding cell when the voltage at the corresponding cell exceeds a predetermined by pass engaging voltage, and thus, the capacity adjustment for the individual cells is achieved. Low cell voltage detection circuits B1 to Bn respectively provided in correspondence to the cells C1 to Cn each check the voltage at the corresponding cell to detect a decrease in the voltage to a level equal to or lower than a predetermined low-voltage decision-making voltage Vc1. An OR circuit 8 executes an OR operation on low-voltage detection signals output from any of the low cell voltage detection circuits B1 to Bn and outputs the results of the OR operation to the control unit 3.

Figure 2:
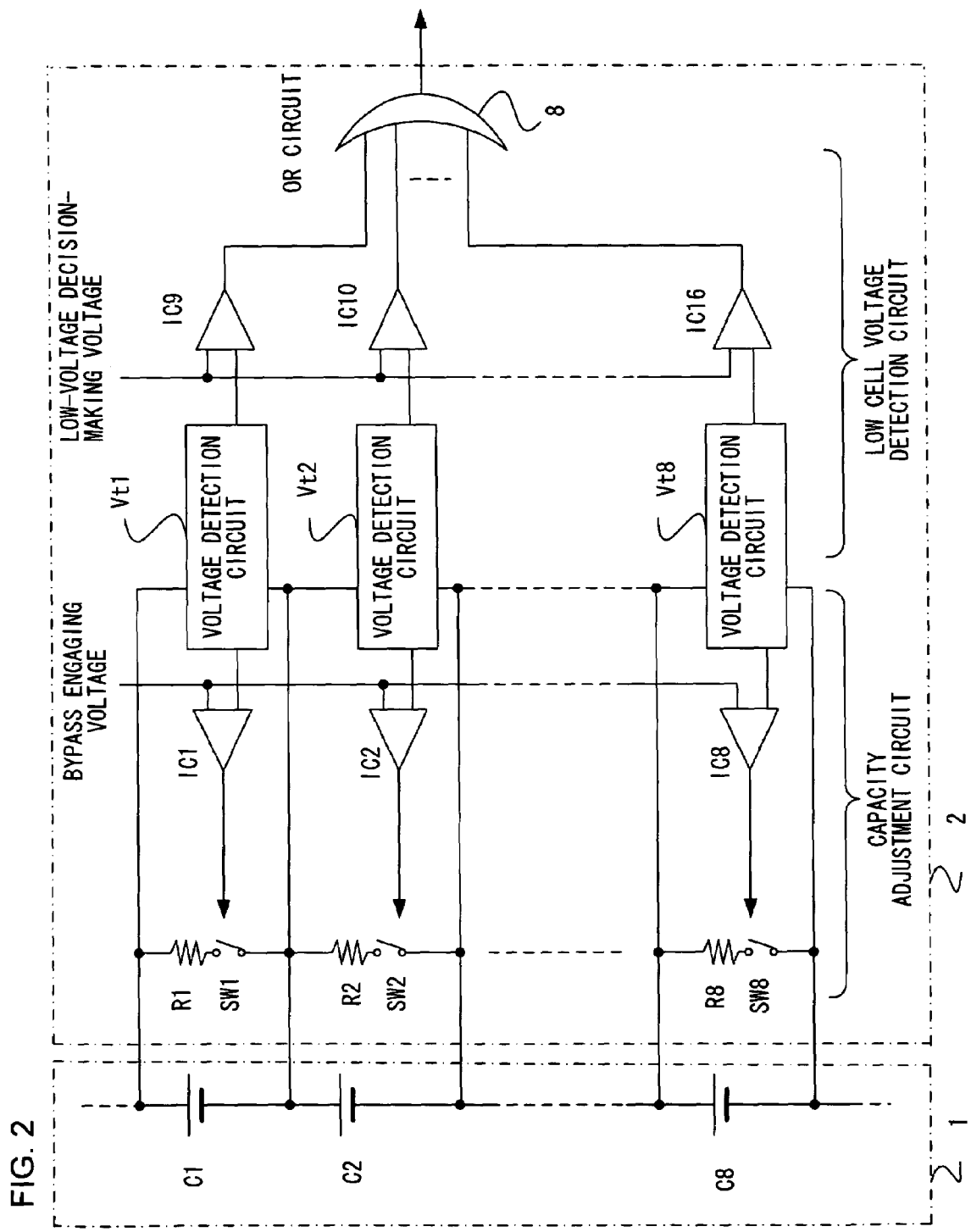
FIG. 2 shows in detail the structure of the circuit that includes capacity adjustment circuits, low cell voltage detection circuits and an OR circuit.

FIG. 2 shows in detail the structure adopted in the circuit that includes the capacity adjustment circuits A1 to An, the low cell voltage detection circuits B1 to Bn and the OR circuit 8 shown in FIG. 1. In order to simplify the explanation, it is assumed that the battery pack 1 is constituted with eight cells C1 to C8. The capacity adjustment circuits A1 to A8 respectively include bypass resistors R1 to R8, switches SW1 to SW8, voltage comparators IC1 to IC 8 and voltage detection circuits Vt1 to Vt8.

The voltage comparators 1C1 to 1C8 compare the cell voltages detected by the voltage detection circuits Vt1 to Vt8 respectively with the predetermined bypass engaging voltage (threshold voltage) and output the results of the comparison to the corresponding switches SW1 to SW8. If a signal indicating that the cell voltage is higher than the bypass engaging voltage is input from any of the voltage comparators 1C1 to 1C8, the corresponding switch SW1 to SW8 enters an ON state. If, for instance, the switch SW1 is turned on, a current flows from the cell C1 via the bypass resistor R1 connected in series with the switch SW1. Namely, if a cell voltage exceeds the bypass engaging voltage, the cell is discharged via the corresponding bypass resistor. As a result, the extent of variance among the voltages at the individual cells is reduced.

The low cell voltage detection circuits B1 to B8 respectively include voltage comparators IC9 to IC16 and the voltage detection circuits Vt1 to Vt8. The voltage comparators IC9 to IC16 respectively compare the cell voltages detected at the voltage detection circuits Vt1 to Vt8 with the predetermined low-voltage decision-making voltage Vc1 and each output a signal indicating a low cell voltage if the corresponding cell voltage is judged to be equal to or lower than the low-voltage decision-making voltage Vc1. The OR circuit 8 outputs a low voltage signal to the control unit 3 if a signal indicating that the cell voltage is equal to or lower than the low-voltage decision-making voltage Vc1 is input thereto from any of the lower cell voltage detection circuits B1 to B8.

Figure 3:
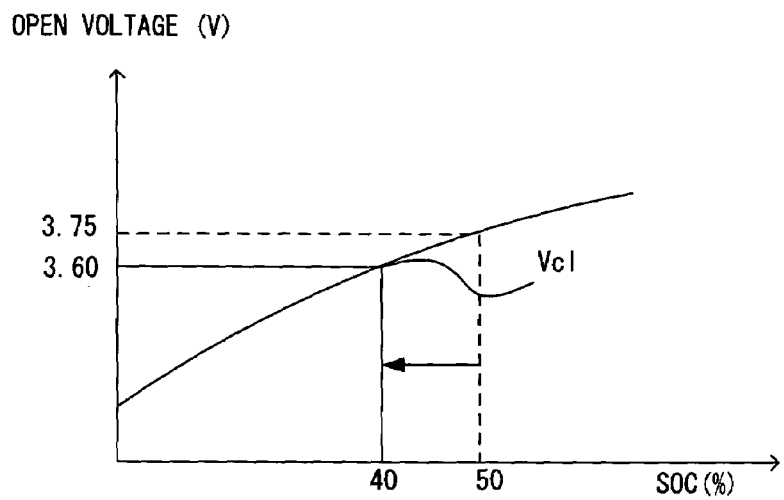
FIG. 3 shows the relationship between the cell SOC and the cell open circuit voltage.

The method adopted to set the low-voltage decision-making voltage Vc1 is now explained in reference to FIG. 3. FIG. 3 shows the relationship between the cell SOC and the cell open circuit voltage. When the target charging rate (target SOC) of the battery pack 1 in a regular charge/discharge mode to be detailed later is 50% and any cell with a charging rate of 40% is to be judged as abnormal, the open circuit voltage (3.60V) corresponding to the charging rate of 40% is set for the low-voltage decision-making voltage Vc1.

Figure 4:
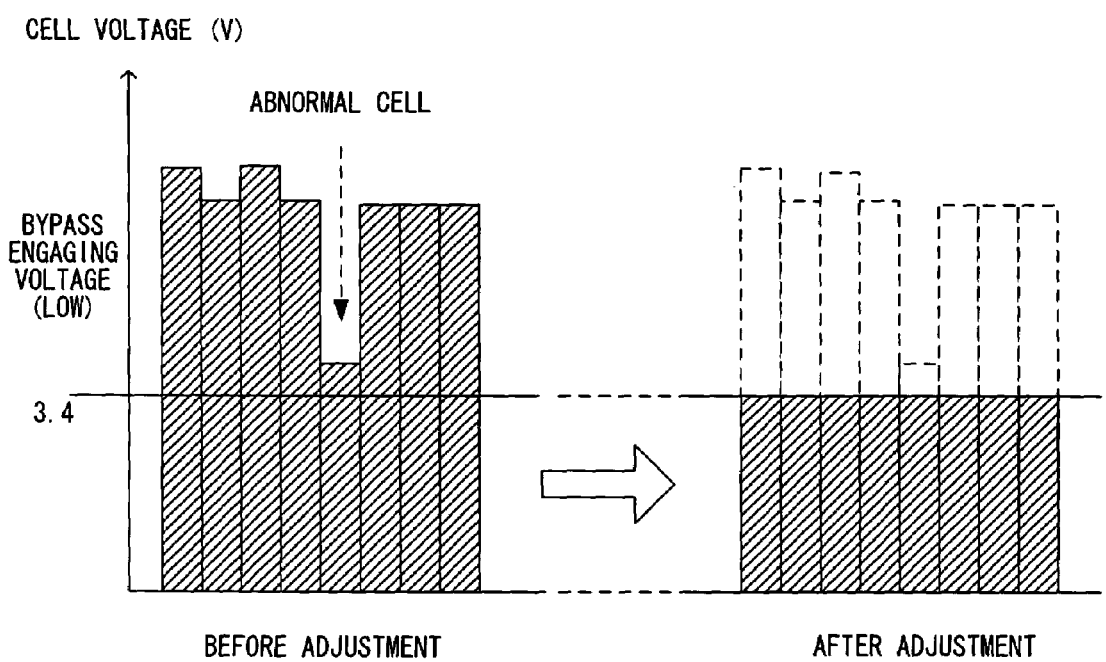
FIG. 4 shows the pre-capacity adjustment voltage variance among the individual cells and the post-capacity adjustment voltage variance, manifesting when the bypass engaging voltage is set to a low value (3.4V)

FIG. 4 shows the pre-capacity adjustment voltage variance among the individual cells and the post-capacity adjustment voltage variance, manifesting when the bypass engaging voltage is set to a low value (3.4V). Since the cell open circuit voltage is 3.75V (see FIG. 3) when the battery pack 1 is charged/discharged at the target charging rate of 50% in the regular charge/discharge mode, the voltages at all the cells exceed the bypass engaging voltage. Thus, when the bypass engaging voltage is set to a low value, the voltages at the individual cells are adjusted to a uniform level, but much electricity is discharged, resulting in a significant energy loss.

Accordingly, the bypass engaging voltage is set to a relatively high value in the battery pack capacity adjustment apparatus in the embodiment. In this example, it is set to a value (e.g., 3.9V) higher than the cell voltage (3.75V) achieved by charging the cells in reference to the target charging rate (50%) in the regular charge/discharge mode.

Figure 5:
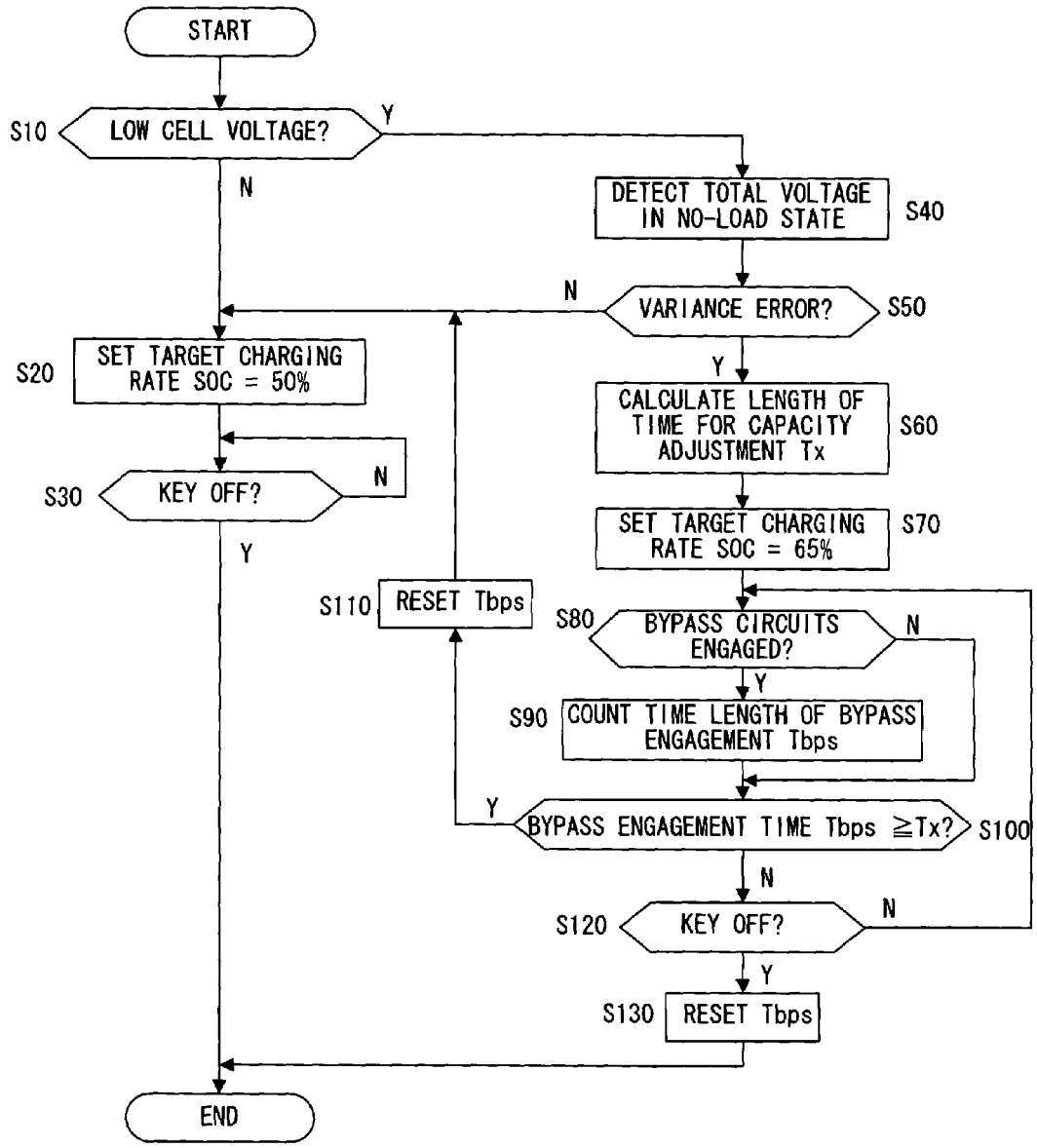
FIG. 5 presents a flowchart of the capacity adjustment procedure executed by the battery pack capacity adjustment apparatus in the embodiment.

FIG. 5 presents a flowchart of the capacity adjustment procedure executed by the battery pack capacity adjustment apparatus in the embodiment. The processing, which starts in step S10 as the key switch (not shown) is turned on, is executed by the CPU 3a in the control unit 3.

In step S10, a decision is made as to whether or not a signal indicating that a cell voltage is equal to or lower than the low-voltage decision-making voltage Vc1 has been input via the OR circuit 8 immediately after the vehicle is started up while the battery pack 1 is in a no-load state. The operation proceeds to step S40 if it is decided that the signal indicating that a cell voltage is equal to or lower than the low-voltage decision-making voltage Vc1 has been input and thus there is a cell with a lowered voltage, whereas the operation proceeds to step S20 otherwise.

The processing executed in steps S20 and S30 is regular charge/discharge mode processing. In step S20, the target charging rate for the battery pack 1 is set to 50%, and then the operation proceeds to step S30. In step S30, a decision is made as to whether or not the key switch (not shown) has been turned off. If the key switch is determined to have been turned off, the entire processing ends, whereas if it is decided that the key switch has not been turned off, the regular charge/discharge mode processing is continuously executed.

In step S40, the total voltage $V_{bat}$ at the battery pack 1 in the no-load state is detected with the voltage sensor 6. Once the total voltage $V_{bat}$ at the battery pack 1 in the no-load state is detected, the operation proceeds to step S50. In step S50, a decision is made as to whether or not the voltages at the individual cells manifest a voltage variance error. First, a voltage variance $\Delta V$ is calculated, as indicated in (1) below.

$$\Delta V = (V_{bat}/n) - Vc1 \tag{1}$$

As expression (1) indicates, the voltage variance $\Delta V$ is the difference between the average voltage among the individual cells C1 to Cn and the low-voltage decision-making voltage Vc1. It is to be noted that "n" indicates the number of cells.

It is decided that a voltage variance error has occurred if the voltage variance $\Delta V$ calculated as indicated in expression (1) is equal to or greater than a predetermined value (e.g., 0.1V). In other words, if the average voltage (Vbat/n) among the cells is equal to or greater than a predetermined threshold value (Vc1+0.1), a voltage variance error is determined to have occurred.

Namely, the battery pack capacity adjustment apparatus in the embodiment judges that a voltage variance error has occurred if there is a cell with the voltage thereof equal to or lower than the low-voltage decision-making voltage Vc1 and the average voltage among the cells is equal to or greater than the predetermined threshold value. The operation proceeds to step S60 if a voltage variance error is determined to have occurred, whereas the operation proceeds to step S20 if it is decided that a voltage variance error has not occurred.

Figure 6:
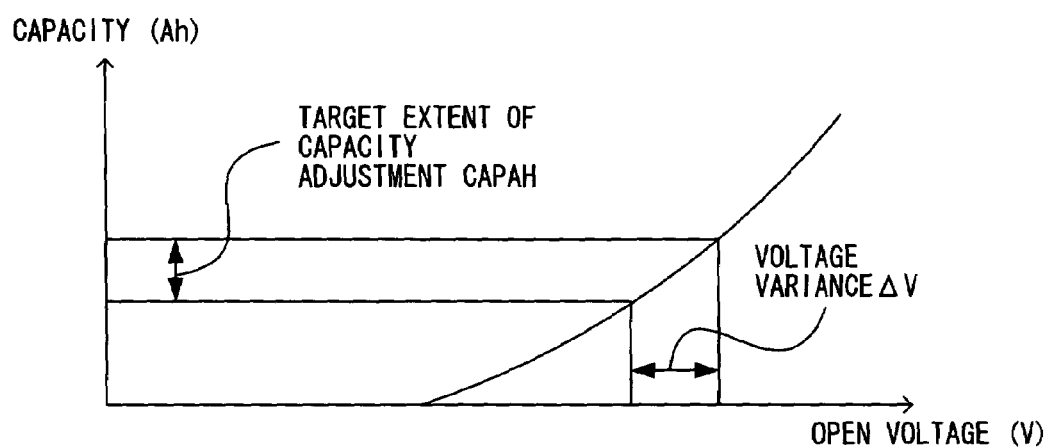
FIG. 6 shows the relationship between the cell open circuit voltage (V) and the cell capacity (Ah)

In step S60, the length of time Tx required to execute the capacity adjustment is calculated. The method adopted to calculate the capacity adjustment time Tx is now explained in reference to FIG. 6. FIG. 6 shows the relationship between the cell open circuit voltage (V) and the cell capacity (Ah). A bypass current $I_{bps}$ is first determined as indicated in (2) below. R shown in (2) represents the bypass resistance and $V_{bps}$ represents the bypass engaging voltage.

$$I_{bps}(A) = V_{bps}(V)/R(\Omega) \tag{2}$$

Next, the required extent of capacity adjustment CAPAH is determined based upon the voltage variance $\Delta V$ determined in step S40 and the open circuit voltage-capacity characteristics shown in FIG. 6. Then, based upon the required extent of capacity adjustment CAPAH and the bypass current $I_{bps}$ determined as indicated in expression (2), the capacity adjustment time Tx is calculated as indicated in (3) below.

$$Tx(\min) = CAPAH(Ah)/I_{bps}(A) \times 60(\min) \tag{3}$$

The processing executed in steps S70 through S130 is capacity adjustment mode processing. In step S70, the target charging rate for the battery pack 1 is set to 65%, which is higher than the target charging rate (50%) set in the regular charge/discharge mode. The charging rate corresponding to the cell open circuit voltage of 3.9V is ascertained by using the SOC-open circuit voltage curve in FIG. 3 so as to ensure that the cell voltages reach the bypass engaging voltage level (3.9V) as the battery pack 1 is charged/discharged.

In step S80, a decision is made as to whether or not the capacity adjustment circuits A1 to An are engaged in operation. This decision is made based upon the total voltage $V_{bat}$ at the battery pack 1 detected by the voltage sensor 6. Namely, the capacity adjustment circuits A1 to An are determined to be engaged in operation if the relationship expressed as in (4) below is satisfied, whereas the capacity adjustment circuits A1 to An are determined not to be engaged in operation if the relationship in expression (4) is not satisfied.

$$V_{bat} \geq V_{bps} \times n \ (n: \text{number of cells}) \quad (4)$$

The operation proceeds to step S90 if it is decided that the capacity adjustment circuits A1 to An are engaged in operation, whereas the operation proceeds to step S100 if it is decided that they are not engaged in operation.

In step S90, the timer 3d starts a count of the time length of bypass engagement $T_{bps}$. After the count of the time length of bypass engagement $T_{bps}$ starts, the operation proceeds to step S100. In step S100, a decision is made as to whether or not the time length of bypass engagement $T_{bps}$, the count of which has started in step S90, has become equal to or greater than the capacity adjustment time Tx calculated in step S60. If it is decided that $T_{bps} \geq Tx$ is true, the operation proceeds to step S110 judging that the capacity adjustment for the battery pack 1 has been completed. In step S110, the time length of bypass engagement $T_{bps}$ is reset and then the operation proceeds to step S20 to execute the regular charge/discharge mode processing.

If, on the other hand, it is decided in step S100 that the time length of bypass engagement $T_{bps}$ is less than the capacity adjustment time Tx, the operation proceeds to step S120. In step S120, a decision is made as to whether or not the key switch (not shown) has been turned off. The operation proceeds to step S130 if the key switch is determined to have been turned off, whereas the operation returns to step S80 if it is decided that the key switch has not been turned off. In step S130, the time length of bypass engagement $T_{bps}$ is reset and the entire processing ends.

Figure 7:
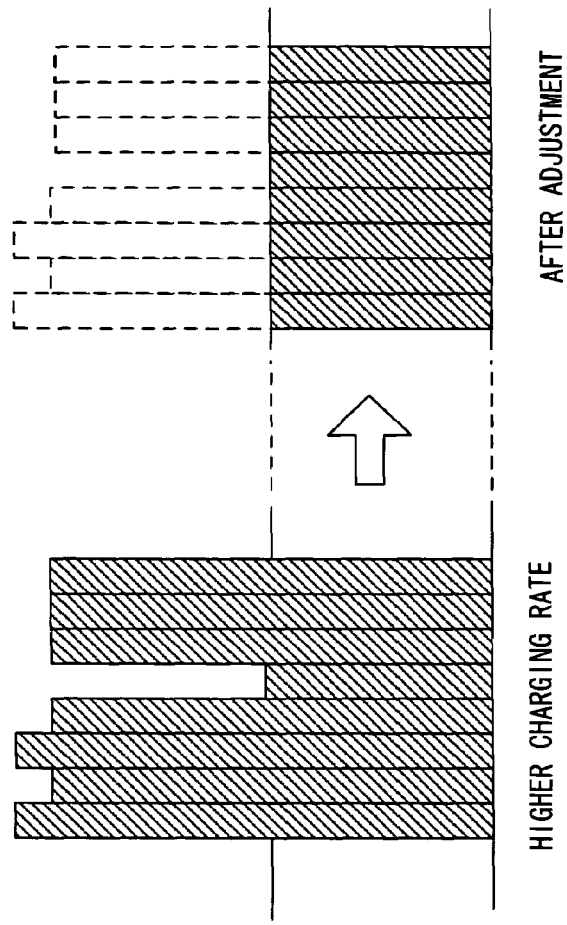
FIGS. 7A–7C show changes occurring in the voltages at the individual cells when the capacity adjustment is executed by the battery pack capacity adjustment apparatus in the embodiment.

FIG. 7 shows changes occurring in the voltages at the individual cells as the capacity adjustment is executed by the battery pack capacity adjustment apparatus in the embodiment. Since there is a cell with the cell voltage thereof equal to or lower than the low-voltage decision-making voltage Vc1 (3.6V) and the voltage variance ΔV calculated as indicated in expression (1) is equal to or greater than the predetermined value (0.1V) prior to the capacity adjustment, the target charging rate for the battery pack 1 is set to 65% which is higher than the regular target charging rate (steps S10 and S40 to S70 in the flowchart presented in FIG. 5). As a result, the voltages at the individual cells exceed the level of the bypass engaging voltage (3.9V). Subsequently, the capacities of the individual cells are adjusted by the capacity adjustment circuits A1 to An in reference to the bypass engaging voltage.

Figure 8:
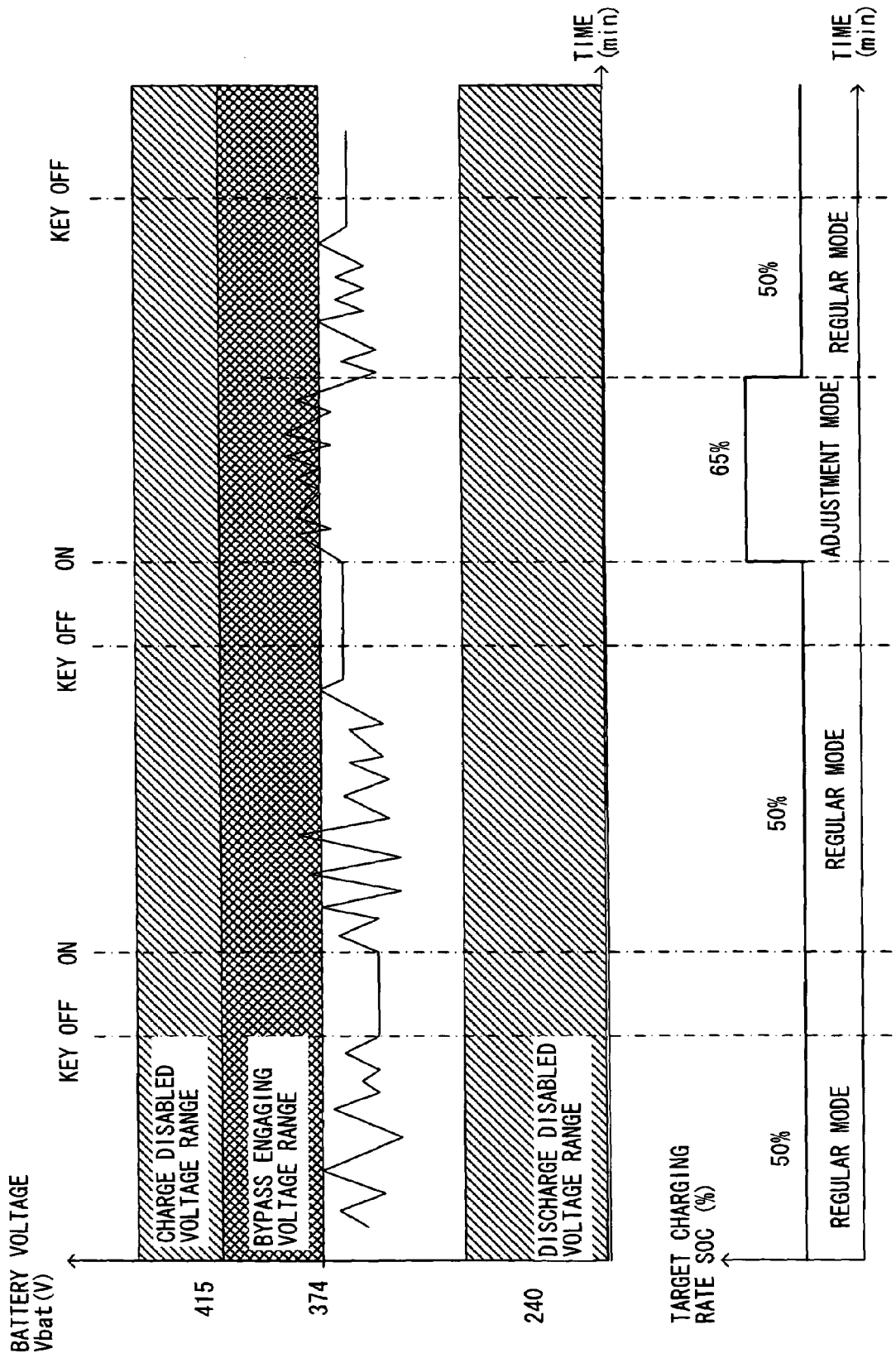
FIG. 8 shows the relationship between the change occurring over time in the total voltage at the battery pack and the target charging rate.

FIG. 8 shows the relationship between the change occurring over time in the total voltage $V_{bat}$ at the battery pack 1 and the target charging rate. While the key switch (not shown) remains in an ON state, the total voltage $V_{bat}$ at the battery pack 1 fluctuates as the battery pack 1 is charged/discharged. Since the bypass engaging voltage $V_{bps}$ is set to a relatively high value as described earlier, only cells with the voltages thereof exceeding the bypass engaging voltage $V_{bps}$ are discharged via bypass resistors and cells with low voltages do not undergo the capacity adjustment in the regular charge/discharge mode.

As has been explained in reference to the flowchart presented in FIG. 5, if there is a cell with the voltage thereof lower than the predetermined low-voltage decision-making voltage Vc1 and the voltage variance ΔV among the individual cells is equal to or greater than the predetermined value, it is judged that the capacity adjustment is necessary and accordingly, the capacity adjustment is executed in the capacity adjustment mode. Namely, the target charging rate set at 50% in the regular charge/discharge mode is raised to 65%. As a result, the frequency of the total voltage $V_{bat}$ at the battery pack 1 reaching the bypass engaging voltage range increases. Consequently, the voltages at the individual cells C1 to Cn exceed the level of the bypass engaging voltage $V_{bps}$ and accordingly, the capacity adjustment circuits A1 to An adjust the voltages at all the cells to the level of the bypass engaging voltage $V_{bps}$.

The battery pack capacity adjustment apparatus in the embodiment judges that the capacity adjustment for the individual cells is necessary if it is decided that there is a cell with the voltage thereof lower than the predetermined low-voltage decision-making voltage and it is also decided that the average voltage among the cells is higher than the predetermined threshold value, and accordingly, executes the capacity adjustment so as to equalize the voltages at the individual cells. Thus, a decision as to whether or not the cell capacity adjustment is necessary can be made with a high degree of reliability through a simple structure.

In addition, if it is decided that the capacity adjustment is necessary, the target charging rate is set to a value higher than the value set for the target charging rate (50%) in the regular charge/discharge mode and the voltages at the cells are caused to exceed the level of the bypass engaging voltage. As a result, the capacity adjustment of the individual cells can be executed with a high degree of reliability.

Furthermore, the battery pack capacity adjustment apparatus in the embodiment calculates the length of time required to execute the capacity adjustment based upon the predetermined low-voltage decision-making voltage and the average voltage among the cells, and sustains the higher target charging rate for the battery pack so as to ensure that the voltages at the plurality of cells exceed the predetermined bypass engaging voltage during the capacity adjustment time thus calculated. As a result, the target charging rate is raised only while necessary to minimize the extent of power generation energy loss occurring due to the capacity adjustment.

The present invention is not limited to the embodiment explained above. For instance, while an explanation is given above on an example in which the battery pack capacity adjustment apparatus is adopted in a hybrid car, it may instead be adopted in an electric car or in a system other than a vehicle.

While the second target charging rate (65% in the embodiment) set in the capacity adjustment mode corresponds to the cell open circuit voltage of 3.9V, it may assume a value corresponding to a voltage higher than the bypass engaging voltage (3.9V in the embodiment). In such a case, the number of cells with the voltages thereof exceeding the bypass engaging voltage as the battery pack 1 is charged at the second target charging rate further increases, and thus, the capacity adjustment can be executed with an even higher degree of efficiency. However, if the second target charging rate is set to an excessively high value, the quantities of electrical charges to be discharged during the capacity adjustment increase, and for this reason, it is more desirable to set a value slightly higher than the value of the charging rate corresponding to the bypass engaging current.

The disclosure of the following priority application is herein incorporated by reference:

Japanese Patent Application No. 2004-84587 filed Mar. 23, 2004

What is claimed is:

1. A battery pack capacity adjustment apparatus for a battery pack constituted by connecting in series a plurality of cells comprising:
   a cell voltage detection device that detects cell voltages at the plurality of cells;
   a first voltage decision-making device that makes a decision as to whether or not there is any cell with a voltage lower than a predetermined low-voltage decision-making voltage among the cell voltages detected by the cell voltage detection device;
   a second voltage decision-making unit that makes a decision as to whether or not a voltage value determined based upon the voltages at the individual cells is higher than a predetermined threshold value; and
   a capacity adjustment decision-making unit that determines that a capacity adjustment for the plurality of cells is necessary if the first voltage decision-making device decides that there is a cell with a voltage lower than the predetermined low-voltage decision-making voltage and the second voltage decision-making unit decides that the voltage value determined based upon the voltages at the individual cells is higher than the predetermined threshold value.

2. A battery pack capacity adjustment apparatus according to claim 1, further comprising:
   an average voltage calculation unit that calculates an average voltage among the plurality of cells, wherein:
   the voltage value determined based upon the voltages at the individual cells is the average voltage calculated by the average voltage calculation unit.

3. A battery pack capacity adjustment apparatus according to claim 2, further comprising:
   a total voltage detection device that detects a total voltage at the battery pack in a no-load state, wherein:
   the average voltage calculation unit calculates the average voltage among the plurality of cells based upon the total voltage at the battery pack detected by the total voltage detection device.

4. A battery pack capacity adjustment apparatus according to claim 1, further comprising:
   capacity adjustment circuits each provided in correspondence to one of the plurality of cells to execute capacity adjustment by discharging the corresponding cell when the voltage at the corresponding cell exceeds a predetermined bypass engaging voltage; and
   a charge/discharge control unit that controls charge/discharge of the battery pack so as to ensure that the voltages at the plurality of cells exceed the predetermined bypass engaging voltage if the capacity adjustment decision-making unit determines that the capacity adjustment is necessary.

5. A battery pack capacity adjustment apparatus according to claim 4, further comprising:
   a capacity adjustment time calculation unit that calculates a length of time required to execute the capacity adjustment based upon the predetermined low-voltage decision-making voltage and an average voltage among the cells, wherein:
   the charge/discharge control unit controls the charge/discharge of the battery pack so as to ensure that the voltages at the plurality of cells exceed the predetermined bypass engaging voltage at least over the length of time required to execute the capacity adjustment having been calculated by the capacity adjustment time calculation unit.

6. A battery pack capacity adjustment apparatus according to claim 4, wherein:
   the charge/discharge control unit raises a target charging rate for the battery pack from a first target charging rate to a second target charging rate in order to ensure that the voltages at the plurality of cells exceed the predetermined bypass engaging voltage.

7. A battery pack capacity adjustment apparatus according to claim 6, wherein:
   the predetermined bypass engaging voltage is a voltage higher than the average voltage among the individual cells achieved by charging/discharging the battery pack at the first target charging rate and also equal to or lower than the average voltage among the individual cells achieved by charging/discharging the battery pack at the second target charging rate.

8. A battery pack capacity adjustment apparatus for a battery pack constituted by connecting in series a plurality of cells comprising:
   a cell voltage detection means for detecting cell voltages at the plurality of cells;
   a first voltage decision-making means for making a decision as to whether or not there is any cell with a voltage lower than a predetermined low-voltage decision-making voltage among the cell voltages detected by the cell voltage detection means;
   a second voltage decision-making means for making a decision as to whether or not a voltage value determined based upon the voltages at the individual cells is higher than a predetermined threshold value; and
   a capacity adjustment decision-making means for determining that a capacity adjustment for the plurality of cells is necessary if the first voltage decision-making means decides that there is a cell with a voltage lower than the predetermined low-voltage decision-making voltage and the second voltage decision-making means decides that the voltage value determined based upon the voltages at the individual cells is higher than the predetermined threshold value.

9. A battery pack capacity adjustment method for a battery pack constituted by connecting in series a plurality of cells, comprising steps for:
   detecting cell voltages at the plurality of cells;
   making a decision as to whether or not there is any cell with a voltage lower than a predetermined low-voltage decision-making voltage among the cell voltages having been detected;
   making a decision as to whether or not a voltage value determined based upon the voltages at the individual cells is higher than a predetermined threshold value; and
   determining that a capacity adjustment for the plurality of cells is necessary if a cell with a voltage lower than the predetermined low-voltage decision-making voltage is judged to be present and the voltage value determined based upon the voltages at the individual cells is judged to be higher than the predetermined threshold value.

10. A battery pack capacity adjustment apparatus for a battery pack constituted by connecting in series a plurality of cells comprising:
   a cell voltage detection device that detects cell voltages of the cells;

a first voltage decision-making device that makes a decision as to whether or not there is any of the cells with a voltage lower than a predetermined low-voltage decision-making voltage;
a second voltage decision-making unit that makes a decision as to whether or not a voltage value determined based upon the detected cell voltages is higher than a predetermined threshold value; and
a capacity adjustment decision-making unit that determines that a capacity adjustment for the plurality of cells is necessary if the first voltage decision-making device decides that there is a cell with a voltage lower than the predetermined low-voltage decision-making voltage and the second voltage decision-making unit decides that the voltage value determined based upon the detected cell voltages is higher than the predetermined threshold value.

11. A battery pack capacity adjustment apparatus according to claim 10, further comprising:
a charge/discharge control unit that controls charge/discharge of the battery pack so as to adjust the capacity of the cells when the capacity adjustment decision-making unit determines that a capacity adjustment for the plurality of cells is necessary.

* * * * *